(12) United States Patent
Barrick

(10) Patent No.: US 10,916,028 B1
(45) Date of Patent: Feb. 9, 2021

(54) SENSOR ASSEMBLY FOR AN AGRICULTURAL IMPLEMENT AND RELATED SYSTEMS AND METHODS FOR MONITORING FIELD SURFACE CONDITIONS

(71) Applicant: CNH Industrial America LLC, New Holland, PA (US)

(72) Inventor: Christopher Barrick, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/547,893

(22) Filed: Aug. 22, 2019

(51) Int. Cl.
| | | |
|---|---|---|
| *G06T 7/60* | (2017.01) | |
| *A01B 79/00* | (2006.01) | |
| *A01B 69/00* | (2006.01) | |
| *H04N 5/225* | (2006.01) | |
| *G06T 7/00* | (2017.01) | |

(52) U.S. Cl.
CPC .............. *G06T 7/60* (2013.01); *A01B 69/001* (2013.01); *G06T 7/0002* (2013.01); *H04N 5/2253* (2013.01); *H04N 5/2256* (2013.01); *G06T 2207/30188* (2013.01); *G06T 2207/30252* (2013.01)

(58) Field of Classification Search
CPC ...................... G06T 7/60; G06T 7/0002; G06T 2207/30188; G06T 2207/30252; A01B 69/001; H04N 5/2253; H04N 5/2256
USPC .......................................................... 348/135
See application file for complete search history.

(56) References Cited

U.S. PATENT DOCUMENTS

| | | | |
|---|---|---|---|
| 4,769,700 A | 9/1988 | Pryor | |
| 5,927,603 A * | 7/1999 | McNabb | .............. A01G 25/092 239/63 |
| 9,734,400 B2 * | 8/2017 | Shriver | ................ G01N 33/025 |
| 10,028,424 B2 | 7/2018 | Zemenchik et al. | |
| 10,255,670 B1 * | 4/2019 | Wu | ....................... H04N 5/2252 |

(Continued)

FOREIGN PATENT DOCUMENTS

| | | |
|---|---|---|
| WO | WO 2018/234733 | 12/2018 |
| WO | WO 2018/167215 | 9/2019 |

OTHER PUBLICATIONS

International Search Report and Written Opinion issued in corresponding Application No. PCT/US2020/046879 dated Nov. 10, 2020 (15 pages).

*Primary Examiner* — Susan E. Hodges
(74) *Attorney, Agent, or Firm* — Rebecca L. Henkel; Rickard K. DeMille

(57) ABSTRACT

A system for monitoring field surface conditions includes a support arm and a housing coupled to the support arm such that the housing is supported adjacent to a surface of a field, with the housing extending over a portion of the surface such that a shielded surface area is defined underneath the housing. The system also includes a light source configured to illuminate at least a portion of the shielded surface area defined underneath the housing such that a shadow is created adjacent a surface feature positioned within the shielded surface area and an imaging device configured to capture an image of the surface feature and the adjacent shadow created by the surface feature. Moreover, the system includes a controller configured to estimate a parameter associated with the surface feature based at least in part on an analysis of the adjacent shadow depicted within the image.

8 Claims, 7 Drawing Sheets

(56) References Cited

U.S. PATENT DOCUMENTS

| | | |
|---|---|---|
| 2004/0149893 A1 | 8/2004 | Scott |
| 2015/0015697 A1* | 1/2015 | Redden .............. G01N 33/0098 348/89 |
| 2016/0029547 A1* | 2/2016 | Casper ................ A01B 63/002 701/50 |
| 2016/0054235 A1* | 2/2016 | Kim ................... G01N 21/8806 356/237.3 |
| 2018/0206393 A1 | 7/2018 | Stoller et al. |
| 2018/0310469 A1 | 11/2018 | Posselius et al. |
| 2018/0310474 A1 | 11/2018 | Posselius et al. |
| 2019/0095710 A1* | 3/2019 | Rees ..................... G06K 9/346 |

\* cited by examiner

SENSOR ASSEMBLY FOR AN AGRICULTURAL IMPLEMENT AND RELATED SYSTEMS AND METHODS FOR MONITORING FIELD SURFACE CONDITIONS

FIELD OF THE INVENTION

The present subject matter relates generally to agricultural implements, such as tillage implements, and, more particularly, to a sensor assembly for an agricultural implement that allows for one or more surface conditions of a field to be monitored during the performance of an agricultural operation, as well as related systems and methods for monitoring the surface condition(s) using the sensor assembly.

BACKGROUND OF THE INVENTION

It is well known that to attain the best agricultural performance from a piece of land, a farmer must cultivate the soil, typically through a tillage operation. Common tillage operations include plowing, harrowing, and subsoiling. Farmers perform these tillage operations by pulling a tillage implement behind an agricultural work vehicle, such as a tractor. Depending on the crop selection and the soil conditions, a farmer may need to perform several tillage operations at different times over a crop cycle to properly cultivate the land to suit the crop choice.

For example, modern farm practices demand a smooth, level field with small clods of soil in the fall and spring of the year. In this regard, residue must be cut, sized and mixed with soil to encourage the residue to decompose and not build up following subsequent passes of machinery. To achieve such soil conditions, it is known to utilize rolling baskets, such as crumbler reels, to produce smaller, more uniform clod sizes and to aid in the mixing of residue. However, the ability of an operator to assess the effectiveness of a tillage operation in breaking down soil clods and/or otherwise providing desired surface conditions for the field is quite limited. Typically, the operator is required to stop the current operation and visually assess the field following a tillage pass to determine soil clod sizing and other surface condition characteristics.

Accordingly, a sensor assembly for an agricultural implement that allows for one or more surface conditions of a field to be monitored during the performance of an agricultural operation, as well as related systems and methods for monitoring the surface condition(s) would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for monitoring field surface conditions during the performance of an agricultural operation. The system includes a support arm configured to be coupled to a frame of an agricultural implement and a housing coupled to the support arm such that the housing is supported adjacent to a surface of a field, with the housing extending over a portion of the surface such that a shielded surface area is defined underneath the housing across said portion of the surface. The system also includes a light source supported relative to the housing, with the light source configured to illuminate at least a portion of the shielded surface area defined underneath the housing such that a shadow is created adjacent a surface feature positioned within the shielded surface area due to light from the light source being blocked by the surface feature. Additionally, the system includes an imaging device positioned within the housing such that the imaging device has a field of view directed towards the at least a portion of the shielded surface area, with the imaging device configured to capture an image of the surface feature and the adjacent shadow created by the surface feature. Moreover, the system includes a controller communicatively coupled to the imaging device, with the controller configured to estimate a parameter associated with the surface feature based at least in part on an analysis of the adjacent shadow depicted within the image.

In another aspect, the present subject matter is directed to a sensor assembly for agricultural implements. The sensor assembly includes a support arm extending between a proximal end and a distal end, with the proximal end configured to be coupled to a frame of an agricultural implement. The sensor assembly also includes a support wheel coupled to the support arm, with the support wheel being configured to engage a surface of a field. Additionally, the sensor assembly includes a housing coupled to the support arm between the proximal and distal ends such that the housing is supported adjacent to the surface of the field when the support wheel is contacting the surface, with the housing extending over a portion of the surface such that a shielded surface area is defined underneath the housing across said portion of the surface. Moreover, the sensor assembly includes a light source supported relative to the housing and an imaging device positioned within the housing such that the imaging device has a field of view directed towards the at least a portion of the shielded surface area. The light source is configured to illuminate at least a portion of the shielded surface area defined underneath the housing such that a shadow is created adjacent a surface feature positioned within the shielded surface area due to light from the light source being blocked by the surface feature. The imaging device is configured to capture an image of the surface feature and the adjacent shadow created by the surface feature.

In a further aspect, the present subject matter is directed to a method for monitoring field surface conditions. The method includes illuminating a portion of a surface of a field located relative to an agricultural implement as the agricultural implement is moved across the field during the performance of an agricultural operation and receiving, with a computing device, an image of both a surface feature positioned relative to the illuminated portion of the surface of the field and an adjacent shadow created by the surface feature. The method also includes analyzing, with the computing device, the image to determine a parameter associated with the adjacent shadow and estimating, with the computing device, a parameter of the surface feature based at least in part on the determined parameter of the adjacent shadow.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
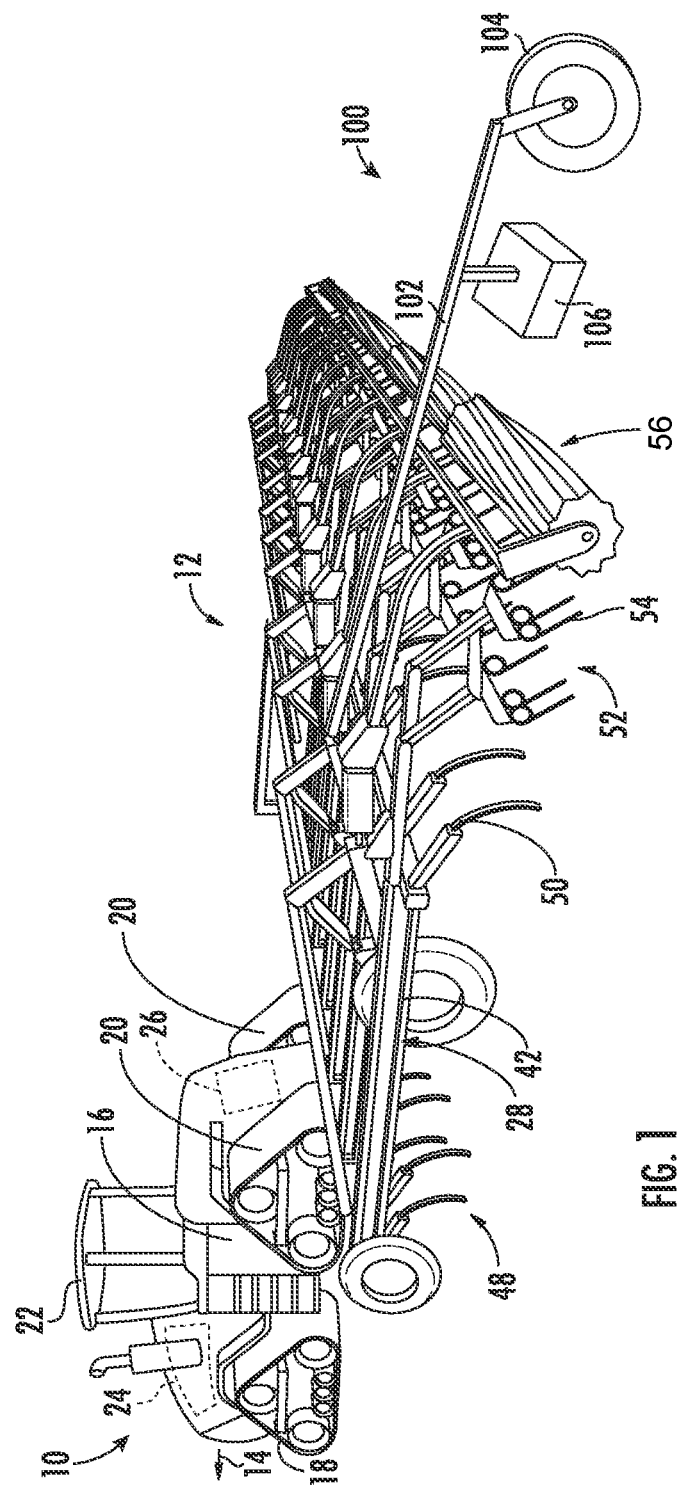
FIG. 1 illustrates a perspective view of one embodiment of an agricultural implement and an associated towing vehicle, particularly illustrating a sensor assembly installed at the aft end of the implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a sensor assembly and related systems and methods for monitoring surface conditions of a field during the performance of an agricultural operation. As will be described below, the sensor assembly may include an imaging device configured to capture images of a portion of the field surface and an associated light source configured to illuminate the portion of the field surface being imaged. Additionally, a controller may be configured to analyze the images captured by the imaging device to evaluate or assess the surface conditions within the field. For instance, the controller may be configured to execute one or more image processing algorithms and/or computer vision techniques (e.g., an edge-finding algorithm) to identify and assess any surface features and adjacent shadows depicted within the images of the illuminated portions of the field surface. Specifically, in one embodiment, the controller may be configured to assess the overall size of soil clods depicted within the images by determining the dimensional parameters of the imaged clods both directly and indirectly (via the adjacent shadows cast by the soil clods).

Figure 2:
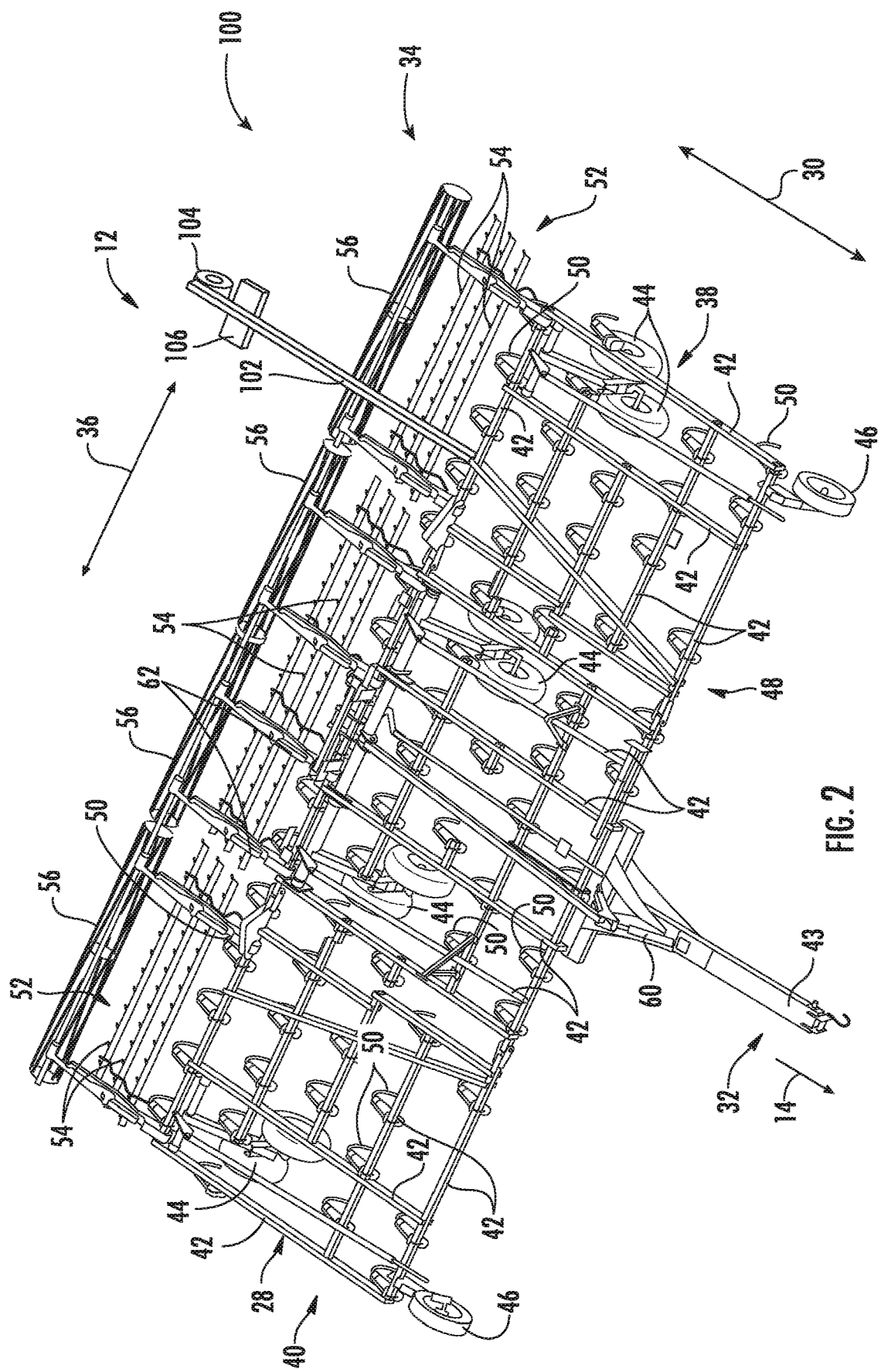
FIG. 2 illustrates another perspective view of the implement and sensor assembly shown in FIG. 1 in accordance with aspects of the present subject matter.

Referring now to the drawings, FIGS. 1 and 2 illustrate differing perspective views of one embodiment of an agricultural machine in accordance with aspects of the present subject matter. Specifically, FIG. 1 illustrates a perspective view of the agricultural machine including a work vehicle 10 and an associated agricultural implement 12. Additionally, FIG. 2 illustrates a perspective view of the agricultural machine, particularly illustrating various components of the implement 12.

In the illustrated embodiment, the agricultural machine corresponds to the combination of the work vehicle 10 and the associated agricultural implement 12. As shown in FIGS. 1 and 2, the vehicle 10 is an agricultural tractor configured to tow the implement 12, namely a tillage implement (e.g., a cultivator), across a field in a direction of travel (e.g., as indicated by arrow 14 in FIG. 1). However, in other embodiments, the agricultural machine may correspond to any other suitable combination of a work vehicle (e.g., an agricultural harvester, a self-propelled sprayer, and/or the like) and agricultural implement (e.g., such as a seeder, fertilizer, sprayer (a towable sprayer or a spray boom of a self-propelled sprayer), mowers, and/or the like). In addition, it should be appreciated that, as used herein, the term "agricultural machine" may refer not only to combinations of agricultural implements and vehicles, but also to individual agricultural implements and/or vehicles.

As shown in FIG. 1, the vehicle 10 may include a frame or chassis 16 configured to support or couple to a plurality of components. For example, a pair of front track assemblies 18 (only one of which is shown) and a pair of rear track assemblies 20 may be coupled to the frame 16. The track assemblies 18, 20 may, in turn, be configured to support the vehicle 10 relative to the ground and move the vehicle 10 in the direction of travel 14 across the field. Furthermore, an operator's cab 22 may be supported by a portion of the frame 16 and may house various input devices for permitting an operator to control the operation of one or more components of the vehicle 10 and/or the implement 12. However, in other embodiments, the vehicle 10 may include wheels (not shown) in place of the front and/or rear track assemblies 18, 20. Furthermore, the vehicle 10 may include one or more devices for adjusting the speed at which the vehicle 10 and implement 12 move across the field in the direction of travel 14. Specifically, in several embodiments, the vehicle 10 may include an engine 24 and a transmission 26 mounted on the frame 16.

As shown in FIGS. 1 and 2, the implement 12 may include an implement frame 28. More specifically, the frame 28 may extend along a lengthwise direction 30 between a forward end 32 and an aft end 34. The frame 28 may also extend along a lateral direction 36 between a first side 38 and a second side 40. In this respect, the frame 28 generally includes a plurality of structural frame members 42, such as beams, bars, and/or the like, configured to support or couple to a plurality of components. Furthermore, a hitch assembly 43 may be connected to the frame 28 and configured to couple the implement 12 to the vehicle 10. Additionally, a plurality of wheel assemblies may be coupled to the frame 28, such as a set of centrally located wheels 44 and a set of front pivoting wheels 46, to facilitate towing the implement 12 in the direction of travel 14.

In several embodiments, the frame 28 may support a cultivator 48, which may be configured to till or otherwise break the soil over which the implement 12 travels to create a seedbed. In this respect, the cultivator 48 may include a plurality of ground engaging shanks 50, which are pulled through the soil as the implement 12 moves across the field in the direction of travel 14. In one embodiment, the ground engaging shanks 50 may be configured to be pivotally mounted to the frame 28 in a manner that permits the penetration depths of the ground engaging shanks 50 to be adjusted.

Moreover, as shown in FIGS. 1 and 2, the implement 12 may also include one or more harrows 52. Specifically, in several embodiments, each harrow 52 may include a plurality of ground engaging tines 54 configured to engage to the surface of the soil within the field in a manner that levels or otherwise flattens any windrows or ridges in the soil created by the cultivator 48. As such, the ground engaging tines 54 may be configured to be pulled through the soil as the implement 12 moves across the field in the direction of travel 14. It should be appreciated that the implement 12 may include any suitable number of harrows 52.

Further, in one embodiment, the implement 12 may include one or more baskets or rotary firming wheels 56. In general, the basket(s) 56 may be configured to reduce the number of clods in the soil and/or firm the soil over which the implement 12 travels. As shown, each basket 56 may be configured to be pivotally coupled to one of the harrows 52. Alternatively, the basket(s) 56 may be configured to be pivotally coupled to the frame 28 or any other suitable location of the implement 12. It should be appreciated that the implement 12 may include any suitable number of baskets 56.

Additionally, the implement 12 may also include any number of suitable actuators (e.g., hydraulic cylinders) for adjusting the relative positioning, penetration depth, and/or down force associated with the various ground engaging tools of the implement 12 (e.g., ground engaging tools 50, 54, 56). For instance, the implement 12 may include one or more first actuators 60 (FIG. 2) coupled to the frame 28 for raising or lowering the frame 28 relative to the ground, thereby allowing the penetration depth and/or the down pressure of the shanks 50 and ground engaging tines 54 to be adjusted. Similarly, the implement 12 may include one or more second actuators 62 (FIG. 2) coupled to the baskets 56 to allow the baskets 56 to be moved relative to the frame 28 such that the down pressure on the baskets 56 is adjustable.

Additionally, in accordance with aspects of the present subject matter, the implement 12 may also include a sensor assembly 100 supported at or adjacent to the aft end 34 of the implement frame 28. For instance, as shown in FIGS. 1 and 2, the sensor assembly 100 may include a support arm 102 coupled to a portion of the rearwardmost toolbar or frame member 42 of the frame 28 and extending outwardly therefrom in a direction opposite the forward travel direction 14 of the implement 12 such that portions of the sensor assembly 100 are supported aft of or behind the rearwardmost ground-engaging tools of the implement 12 (e.g., the baskets 56). For instance, as shown in the illustrated embodiment, the sensor assembly 100 may include a support wheel 104 and a sensor housing 106 supported aft of the rearwardmost ground-engaging tools. As will be described below with reference to FIGS. 3-5, the sensor housing 106 may be configured to support various components for monitoring one or more surface conditions of the field as the implement 12 is being towed across the field during the performance of an agricultural operation.

It should also be appreciated that the configurations of the work vehicle 10 and agricultural implement 12 described above and shown in FIGS. 1 and 2 are provided only to place the present subject matter in an exemplary field of use. Thus, it should be appreciated that the present subject matter may be readily adaptable to any manner of vehicle and/or implement configuration.

Figure 3:
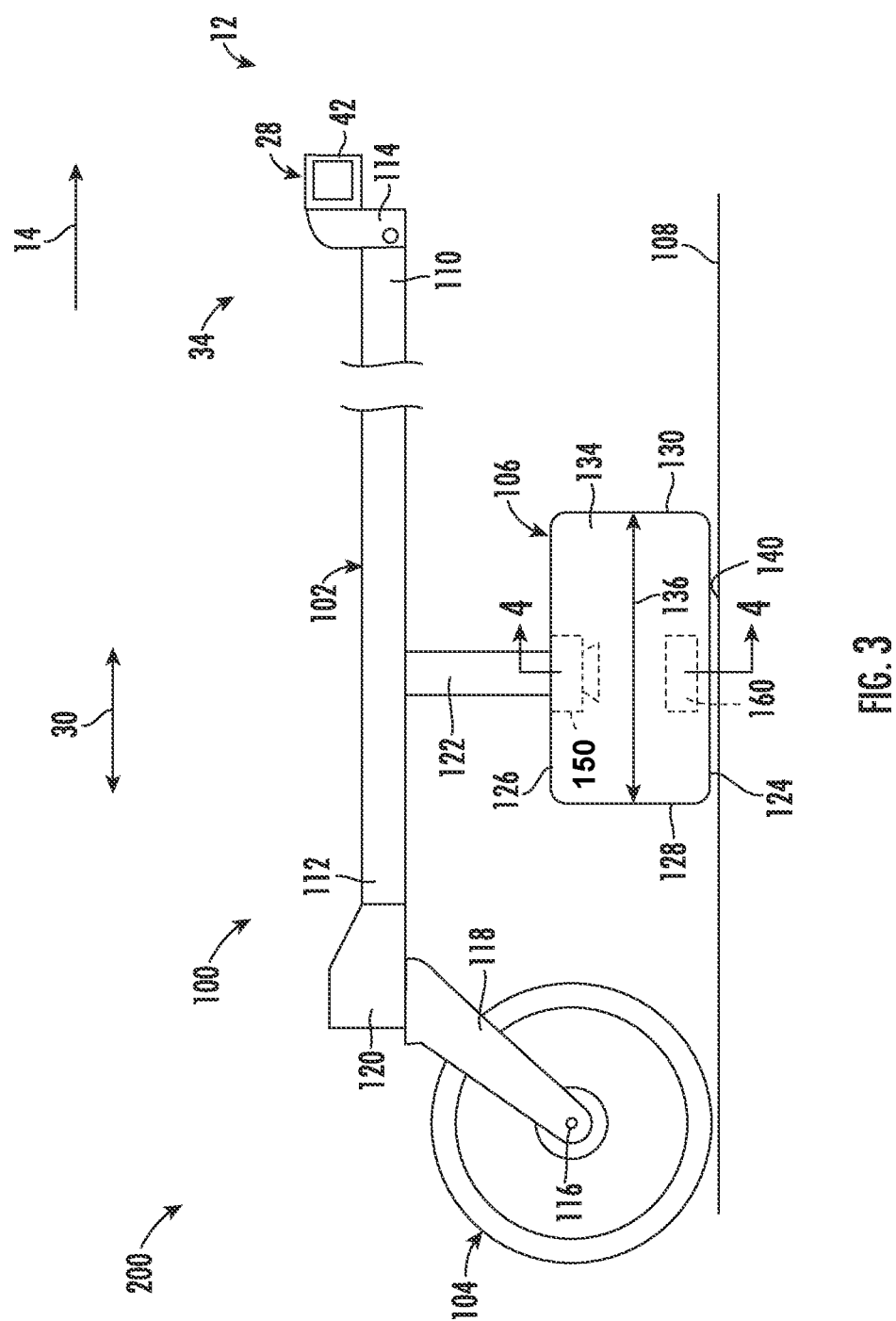
FIG. 3 illustrates a side view of the sensor assembly shown in FIGS. 1 and 2 in accordance with aspects of the present subject matter.
Figure 4:
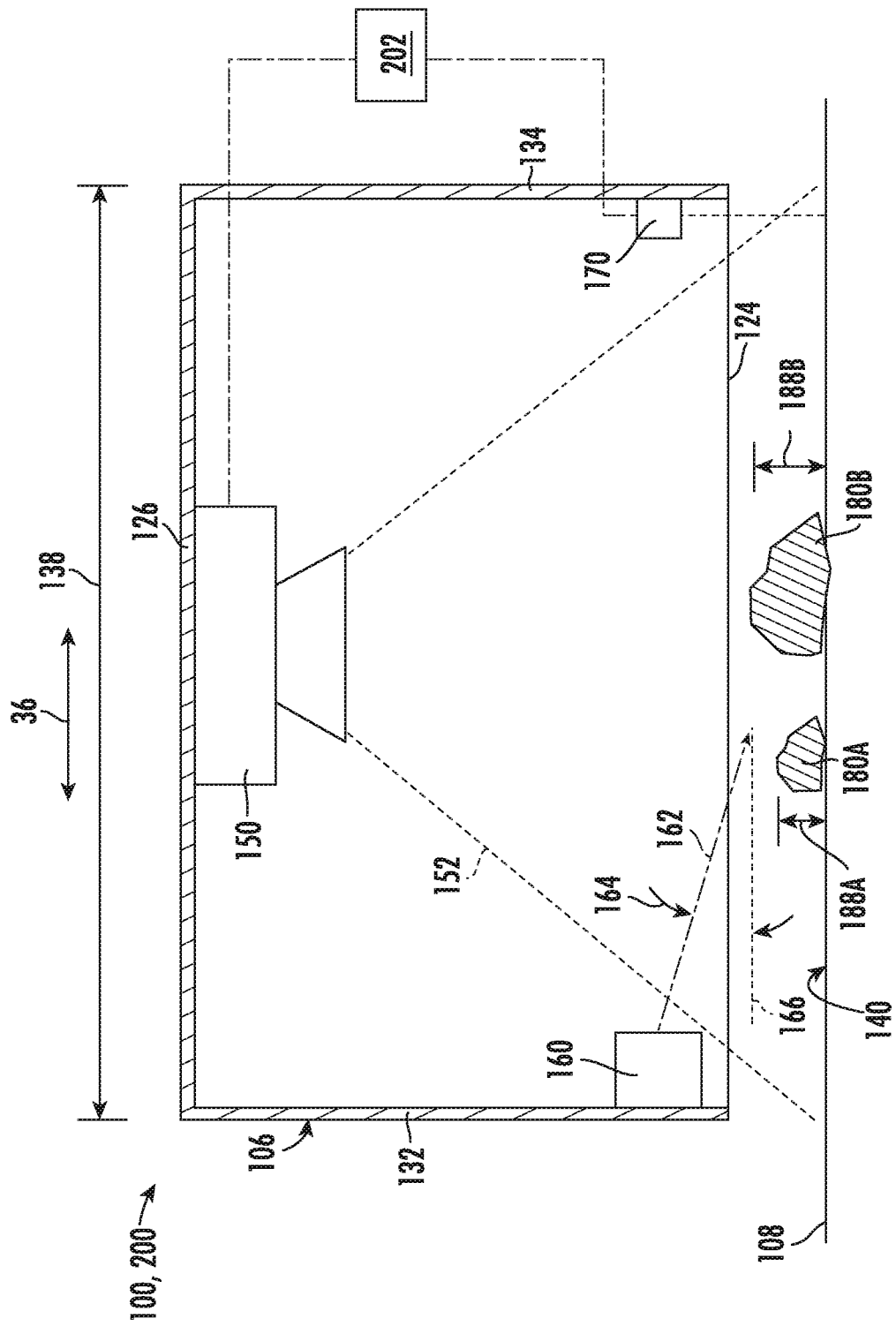
FIG. 4 illustrates a cross-sectional view of a sensor housing of the sensor assembly shown in FIG. 3 taken about line 4-4.
Figure 5:
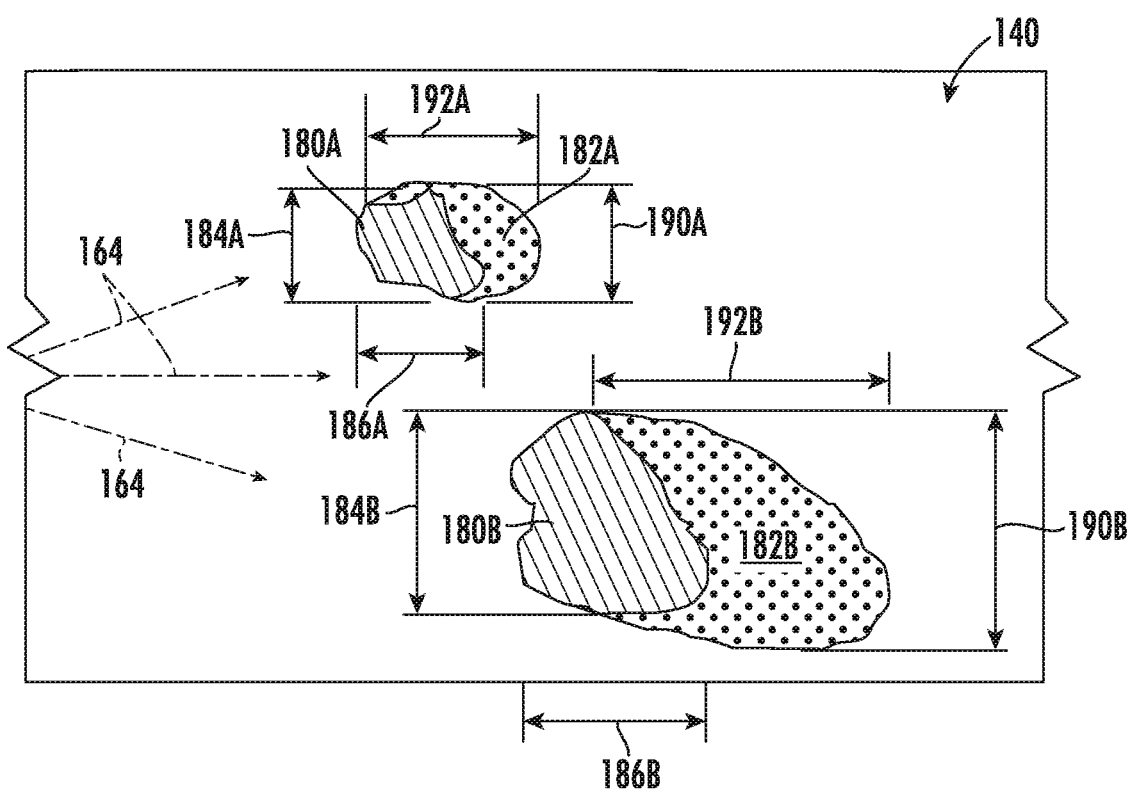
FIG. 5 illustrates a top-down view of a portion of the field located underneath the sensor housing shown in FIG. 4 from the perspective of line 5-5.

Referring now to FIGS. 3-5, several views of one embodiment of the sensor assembly 100 described above with reference to FIGS. 1 and 2, as well as components of one embodiment of a related system 200 for monitoring the surface conditions of a field using the sensor assembly 100, are illustrated in accordance with aspects of the present subject matter. Specifically, FIG. 3 illustrates a schematic, side view of the sensor assembly 100 as coupled to the aft end 34 of the implement frame 28 described above, with many of the various components positioned at the rear of the implement 12 (e.g., the harrows 52 and baskets 56) being removed for purposes of illustration. Additionally, FIG. 4 illustrates a cross-sectional view of a portion of the sensor housing 106 of the sensor assembly 100 shown in FIG. 3 taken about line 4-4. Additionally, FIG. 5 illustrates a top-down view of a portion of the field surface disposed directly below the sensor housing 106 as viewed from the perspective indicated by line 5-5 in FIG. 4. It should be appreciated that, in general, the sensor assembly 100 will be described herein with reference to the implement 12 shown in FIGS. 1 and 2. However, those of ordinary skill in the art should appreciate that the disclosed sensor assembly 100 may be utilized with agricultural implements having any other suitable implement configuration.

As particularly shown in FIG. 3, the sensor assembly 100 may generally include one or more support arms 102 configured to support one or more surface-engaging support wheels 104 and one or more associated sensor housings 106 relative to a surface 108 of the field (FIGS. 3 and 4), In general, the support arm 102 may be configured to extend lengthwise between a proximal end 110 and a distal end 112, with the proximal end 10 configured to be pivotally coupled to a portion of the aftmost toolbar(s) or frame member 42 of the implement frame 28. For example, as shown in FIG. 3, a suitable mounting bracket 114 may be secured between the proximal end 110 of the support arm 102 and the frame member 42 to allow the support arm 102 to be pivotally coupled to the frame member 42, Such a pivotal connection between the support arm 102 and the implement frame 28 may allow the support arm 102 to pivot relative to the frame 28 as the support wheel 104 rides along the surface 108 of the ground during the performance of an agricultural operation. Additionally, as shown in FIG. 3, the support arm 102 may be configured to extend from its proximal end 110 outwardly from the frame member 42 such that the distal end 112 of the support arm 102 is spaced apart from the frame member 42 in a direction opposite the forward travel direction 14 of the implement 12. As indicated above with reference to FIGS. 1 and 2, such extension of the support arm 102 may allow the support wheel 104 and associated sensor housing 106 of the sensor assembly 100 to be supported aft of or behind the rearwardmost tools of the implement 12 (e.g., baskets 56).

As shown in FIG. 3, the support wheel 104 of the sensor assembly 100 may be coupled to a portion of the support arm 102 so that the wheel 104 is allowed to roll across or otherwise engage the soil surface 108 during the performance of an agricultural operation, such as by coupling the support wheel 104 to the distal end 112 of the support arm 102. It should be appreciated that, as used herein, the term "wheel" is used broadly and is intended to cover various embodiments of rolling support devices, including a wheel with or without a tire provided in associated therewith. For example, in several embodiments, the term "wheel" may correspond to a wheel configured to directly contact or engage the field surface 108 around its outer perimeter or the term "wheel" may correspond to a wheel configured to contact or engage the field surface 108 via a tire or suitable inflatable member installed around its outer perimeter.

In several embodiments, the support Wheel 104 may be supported for rotation relative to the adjacent support arm 102 about a rotational axis 116 via a support bracket 118. For instance, the support bracket 118 may correspond to a wheel fork or other similar structure such that the support bracket 118 includes side portions extending along either side of the wheel 104 that receive a shaft or pin defining the rotational axis 116 of the wheel 104. Additionally, as shown in FIG. 3, the support bracket 118 may, in turn, be coupled to the distal end 112 of the support arm 102 via a corresponding mounting bracket 120. In one embodiment, the support bracket 118 may be cantered or otherwise pivotally coupled to the mounting bracket 120 to allow the wheel 104 to pivot or swivel relative to the mounting bracket 120 (and, thus, relative to the support arm 102). Thus, as the implement 12 is turned as it is being towed by the associated work vehicle 10, the wheel 104 may be allowed to swivel or pivot such that the orientation of the rotational axis 116 of the wheel 104 can vary relative to the support arm 102. Such swiveling or pivoting of the wheel 104 allows the wheel 104 to follow the implement 12 without sliding side-to-side.

Moreover, as indicated above, the sensor assembly 100 may also include a sensor housing 106 configured to be coupled to the support arm 102. For instance, as shown in FIG. 3, the sensor housing 106 is coupled to the support arm 102 (e.g., via a mounting arm 122) at a location between the arm's proximal and distal ends 110, 112, such as at a location forward of the support wheel 104 relative to the forward direction of travel 14 of the implement 12. In general, the sensor housing 106 may be configured to be supported relative to the field such that a bottom end 124 of the housing 106 is located adjacent to the field surface 108 when the support wheel 104 is in contact with the surface 108.

As shown in the illustrated embodiment, the sensor housing 106 has a box-like configuration. For instance, in one embodiment, the sensor housing 106 may have a rectangular-shaped box-like configuration having an open bottom end 124 facing the surface 108 of the field, Specifically, as shown in FIGS. 3 and 4, the sensor housing 106 includes a top wall 126 and a plurality of housing walls 128, 130, 132, 134 extending vertically from the top wall 126 to the open bottom end 124 of the housing 106. The housing walls include, for example, front and rear walls 128, 130 (FIG. 3) spaced apart from each other across a length 136 of the housing 106 (e.g., as defined in the lengthwise direction 30), and first and second sidewalk 132, 134 (FIG. 4) spaced apart from each other across a width 138 of the housing 106 (e.g., as defined in the lateral direction 36), With such a configuration, the sensor housing 106 may be configured to shield or shroud a portion of the field surface 108 located directly underneath the housing 106 from direct sunlight. For instance, in the illustrated embodiment, a shielded surface area 140 may be defined directly underneath the housing 106 that generally has a length and width equal to the length 136 and the width 138 of the housing 106. Thus, as the implement 12 is towed across the field during the performance of an agricultural operation, the portion of the field surface 108 currently located underneath the housing 106 may be substantially shielded from sunlight across the shielded surface area 140.

It should be appreciated that, in other embodiments, the sensor housing 106 may have any other suitable shape or configuration that allows it to function as described herein. Specifically, the shape or profile of the housing 106 may be adapted in any manner that allows it support one or more associated components of the sensor assembly 100 (e.g., as described below) while shielding a portion of the field surface 108 from direct sunlight.

Referring still to FIGS. 3-5, the sensor assembly 100 may also include one more sensor or sensor-related components for detecting one or more surface conditions of the field, including one or more characteristics associated with the monitored surface condition(s). Specifically, in several embodiments, the sensor assembly 100 may include an imaging device 150 configured to capture images of a portion of the field surface 108 and an associated light source 160 configured to illuminate the portion of the field surface 108 being imaged. As particularly shown in the FIGS. 3 and 4, in one embodiment, the imaging device 150 and light source 160 may be coupled to the sensor housing 106 at a location within the interior of the housing 106. For instance, as shown in FIG. 4, the imaging device 150 is mounted to the top wall 126 of the housing 106 within the housing's interior such that the imaging device 150 has a field of view 152 directed towards the portion of the field surface 108 positioned directly below the housing 106, namely at the portion of the field surface 108 extending across the shielded surface area 140 created underneath the housing 106. Additionally, as shown in FIG. 4, the light source 160 is mounted to one of the housing walls (e.g., the first sidewall 132) to allow the light source 160 to illuminate the interior of the sensor housing 106, as well as illuminate the shielded surface area 140 defined across the portion of the field surface 108 currently positioned underneath the housing 106.

In several embodiments, the light source 160 may be configured to be positioned within the housing 106 at a location at or adjacent to its bottom end 124, thereby allowing the light source 160 to be disposed generally adjacent to the field surface 108. For instance, as shown in FIG. 4, the light source 160 is mounted to a lower portion of the first sidewall 132 at a location adjacent to the bottom end 124 of the housing 106. As a result, the light source may be configured to direct light (indicated by arrow 162) across the shielded surface area 140 defined underneath the housing at a relatively acute lighting angle 164 defined relative to a horizontal reference plane 166 (e.g., a plane extending generally parallel to the field surface 108). Such an acute lighting angle 164 allows the light 162 transmitted from the light source 160 to be directed across the shielded surface area 140 in a manner that generates shadows along the opposed sides of any surface feature(s) located on the field surface 108. For instance, as shown in the illustrated embodiment, the light 162 transmitted from the light source 160 may be directed towards the adjacent side of one or more soil clods 180A, 180B disposed on the field surface 108, thereby allowing a corresponding shadow (indicated by hatched area 182A, 182B in FIG. 5) to be created or cast along the field surface adjacent the opposed side of each soil clod 180A, 180B (i.e., the side facing away from the light source 160).

By positioning the imaging device 150 within the housing 106 such that it has a field of view 152 directed towards the shielded surface area 140 defined underneath the housing 106 and by configuring the light source 160 to illuminate the shielded surface area 140 in a manner that casts shadows behind any surface feature(s) located within the shielded surface area 140, the images captured by the imaging device 150 can be used to assess the surface condition(s) of the field underneath the housing 106 based on an analysis of the detected surface feature(s) and corresponding shadow(s) within each image. Specifically, in several embodiments, each image can be analyzed to determine one or more dimensional parameters of the surface feature(s) depicted within the image that are visible, viewable, or otherwise detectable within the field of view 152 of the imaging device (e.g., dimensions or related dimensional parameters viewable within a two-dimensional extending perpendicular to the field of view 152). In addition, each image can be analyzed to determine one or more dimensional parameters of each shadow depicted therein image that are visible, viewable, or otherwise detectable within the field of view 152 (e.g., dimensions or related dimensional parameters viewable within a two-dimensional extending perpendicular to the field of view 152). The viewable dimensional parameter(s) determined for each shadow can then be used to estimate or infer an additional dimensional parameter of the corresponding surface feature(s) that is not visible, viewable, or otherwise detectable within the field of view 152 (e.g., dimensions or related dimensional parameters aligned with or extending parallel to the field of view 152).

For instance, in the illustrated embodiment, the light 162 transmitted from the light source 160 is being directed towards two soil clods 180A, 180B located on the field surface 108 within the shielded surface area 140, thereby creating two corresponding shadows 182A 182B cast along the opposed sides of the soil clods 180A, 180B. In such an embodiment, the imaging device 150 may be configured to capture images (e.g., from the perspective shown in FIG. 5) of the soil clods 180A, 180B and the adjacent shadows 182A, 182B. The images captured by the imaging device 150 may then be analyzed (e.g., using suitable image processing algorithms and/or computer-vision techniques) to identify relevant dimensional parameters of the soil clods 1804, 180B. For instance, in the illustrated embodiment, given the field of view 152 of the imaging device 150, the images captured of the soil clods 1804, 180B, themselves, can be used to assess the dimensional parameters of such clods 1804, 180B that are visible, viewable, or otherwise detectable within the field of view 152, such as the dimensional parameters located within two-dimensional plane extending perpendicular to the field of view 152. Specifically, the view of the soil clods 180A, 180B shown in FIG. 5 may allow a length 184A, 184B and a width 186A, 186B of each soil clod 180A, 180B to be detected (or any other dimension across the visible detection plane), as well as the area of each soil clod 180A, 180B across the visible detection plane. However, in the illustrated embodiment, the height 188A, 188B (FIG. 4) of each soil clod 180A, 180B is not detectable from the field of view 152 of the imaging device 150. Thus, in accordance with aspects of the present subject matter, the images may be further analyzed to identify each shadow 182A, 182B depicted within a given image and determine an associated dimensional parameter(s) of the identified shadow 182A, 182B. For instance, each image may be analyzed to determine the total area of each shadow 182A, 182B depicted therein (e.g., based on the number of pixels covered by the shadow) or any other suitable dimensional parameter associated with each shadow 182A, 182B that is viewable within the visible detection plane, such as a length 190A, 190B and/or width 192A, 192B of each shadow 182A 182B. The dimensional parameter(s) determined for each shadow 182A, 182B may then be used to estimate or infer a corresponding dimensional parameter of the surface feature casting such shadow. For instance, in the illustrated embodiment, the area and/or length/width 190, 192 of each shadow 182A, 182B may be used to infer or estimate the corresponding height 188A, 188B of the respective soil clod 182A, 182B. As a result, based on the images captured by the imaging device 104 and the resulting image analysis, surface features of the field, such as soil clods 182A, 182B positioned on the field surface 108, can be assessed in a three-dimensional space, thereby allowing the overall size or volume (referred to simply as "size" for sake of simplicity and without intent to limit) of each surface feature to be more accurately estimated or determined.

It should be appreciated that the lighting angle 164 at which the light source 160 directs light 162 across the shielded surface area 140 defined underneath the housing 106 will generally vary across the width 138 or the length 136 of the housing 106, depending on the position of a given surface feature(s) within the shielded surface area 140 relative to the light source 160. However, in general, the configuration of the light source 160 and/or the positioning of the light source 160 relative to the housing 106 may be selected such that the lighting angle 164 is generally maintained at an angle defined relative to the horizontal reference plane 166 that is less than 25 degrees, such as less than 20 degrees, or less than 15 degrees, or less than 10 degrees.

It should also be appreciated that the lighting angle 164 at which the light source 160 directs light 162 across the shielded surface area 140 will also vary as a function of the positioning or height of the light source 160 relative to the field surface 108. In this regard, as the implement 12 is being towed across the field, the relative positioning between the light source 160 and the field surface 108 will change as the sensor assembly 100 moves relative to the surface 108 (e.g., due to bouncing or relative movement of the support wheel 104), which impacts the effective lighting angle 164 of the light source 160 and, thus, the resulting shadows cast by the surface features. For instance, as the distance between the light source 160 and the field surface 108 increases, the lighting angle 164 will similarly increase, thereby resulting in smaller shadows being created. In contrast, as the distance between the light source 160 and the field surface 108 decreases, the lighting angle 164 will similarly decrease, thereby resulting in larger shadows being created. Such variations in the effective lighting angle 164 can, thus, significantly impact the dimensional parameter(s) being estimated or inferred for a given surface feature(s) based on the depicted shadow (e.g., the height 188 of the soil clods 180 described above).

To monitor such variations in the effective lighting angle 164, the sensor assembly 100 may include a height or position sensor 170 (e.g., an optical range sensor, such as laser-based distance sensor, a radar-based range sensor, a sonar-based range sensor, and/or the like) configured to provide data indicative of the position of the light source 160 relative to the field surface 108, which can then be used to determine the effective lighting angle 164 for the light source 160. For instance, as shown in FIG. 4, a position sensor 170 is mounted to the sensor housing 106 (e.g., to the second sidewall 134) at a height above the field surface 108 generally corresponding to the height of the light source 160 above the surface 108. As such, by continuously detecting the distance or height defined between the sensor 170 and the field surface 108, the associated height or position of the light source 160 relative to the surface 108 can be monitored, thereby allowing the effective lighting angle 164 of the light source 160 to be determined.

As indicated above, FIGS. 3-5 also illustrate components of one embodiment of a system 200 for monitoring the surface conditions of a field. In general, the system 200 may include any combination of the various vehicle, implement, and/or assembly components and/or features described above, such as the various components of the sensor assembly 100 shown in FIGS. 3 and 4. In addition, the system 200 may include a controller 202 configured to analyze the images captured by the imaging device 150 to evaluate or assess the surface conditions within the field. For instance, as will be described below, the controller 202 may include suitable software or computer-readable instructions that allow the controller 202 to execute one or more image processing algorithms and/or computer vision techniques (e.g., an edge-finding algorithm) for identifying and assessing any surface features and adjacent shadows depicted within the images. Specifically, in several embodiments, the controller 202 may utilize the image processing algorithms and/or computer vision techniques to assess the overall size of soil clods depicted within the images by determining the dimensional parameters of the imaged clods both directly and indirectly (via the shadows). In doing so, the controller 202 may also utilize data from the associated position sensor 170 to determine the effective lighting angle 164 of the light source 160 at the instant at which each image is captured, thereby allowing the controller 202 to take into account the lighting angle 164 when analyzing the dimensional parameter(s) of the shadows depicted within the images.

It should be appreciated that the imaging device 150 described above may generally correspond to any suitable sensing device configured to detect or capture image or image-like data indicative of the surface conditions of the field. For instance, in several embodiments, the imaging device 150 may correspond to any suitable camera(s), such as single-spectrum camera or a multi-spectrum camera configured to capture images, for example, in the visible light range. Alternatively, the imaging device(s) 150 may correspond to any other suitable image capture device(s) and/or other vision sensor(s) capable of capturing "images" or other image-like data of the field.

Similarly, it should be appreciated that the light source 160 described above may generally correspond to any suitable light emitting device. For example, in several embodiments, the light source 160 may correspond to one or more light emitting diodes (LEDs). However, in alternative embodiments, the light source 169 may correspond to halogen light emitting device(s), incandescent light emitting device(s), and/or the like.

Additionally, it should be appreciated that, although the sensor assembly 100 and related system 200 are shown and described above as only including a single imaging device 150, a single light source 160, and a single position sensor 170, the present subject matter may generally incorporate any number of imaging devices 150, light sources 160, and/or position sensors 170. Moreover, although only a single sensor assembly 100 has been shown and described herein as being coupled to an associated implement 12, the disclosed system 200 may include or incorporate any number of sensor assemblies 100. For instance, in one embodiment, multiple sensor assemblies 100 may be coupled to the implement frame 28 at its aft end 34 for monitoring surface conditions of the field behind the implement 12.

Figure 6:
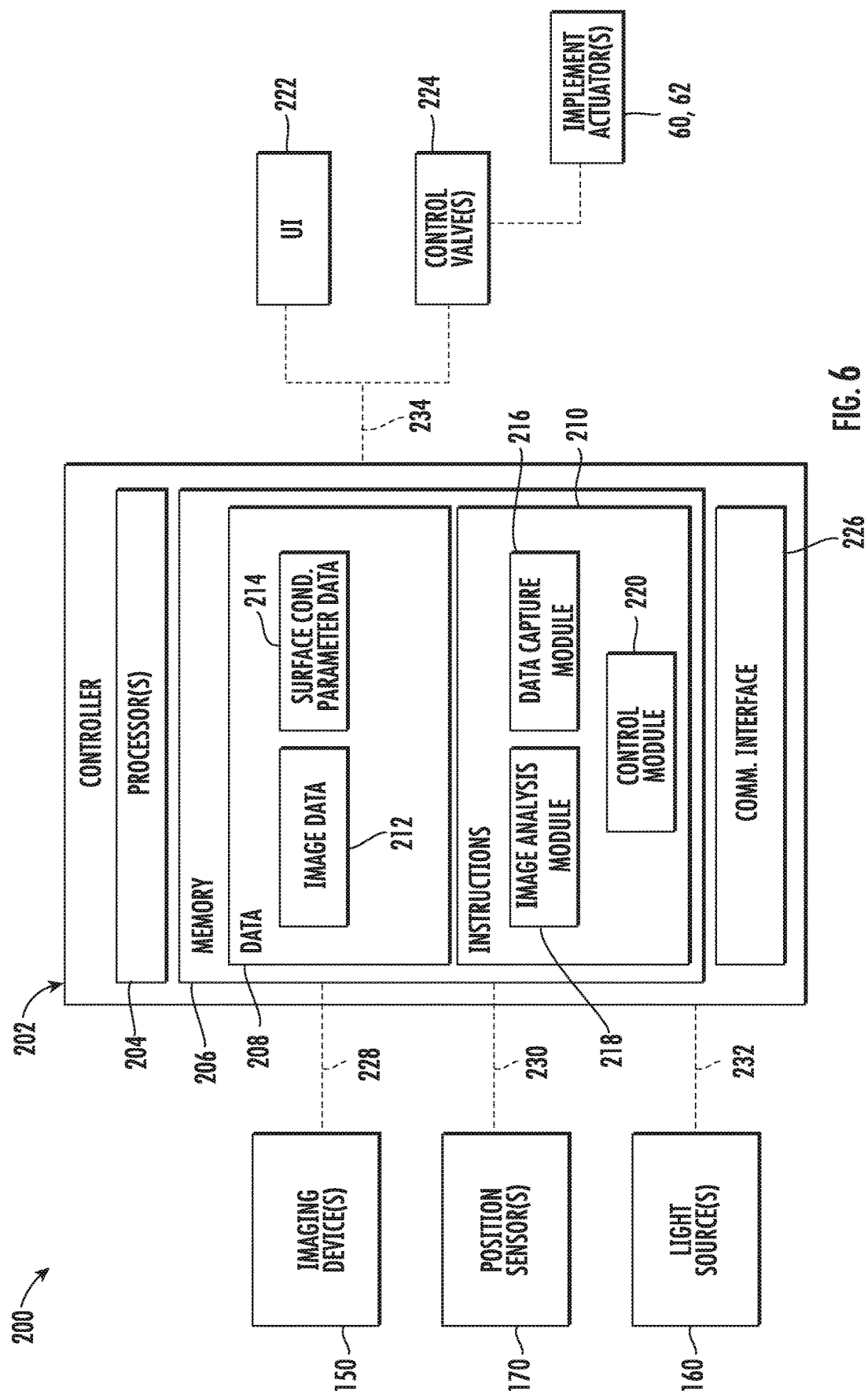
FIG. 6 illustrates a schematic view of one embodiment of a system for monitor surface conditions of a field in accordance with aspects of the present subject matter.

Referring now to FIG. 6, a schematic view of one embodiment of a system 200 for monitoring the surface conditions of a field is illustrated in accordance with aspects of the present subject matter. In general, the system 100 will be described with reference to the implement 12 shown in FIGS. 1 and 2 and the sensor assembly 100 and associated system components shown in FIGS. 3-5. However, in other embodiments, the disclosed system 200 may be utilized to monitor the surface conditions of a field in association with any other suitable agricultural implement having any other suitable implement configuration, with any other suitable sensor assembly having any other suitable configuration, and/or using system components having any other suitable component configuration(s).

As indicated above, in several embodiments, the system 200 may include one or more components of the disclosed sensor assembly 100, such as the imaging device 150, the light source 160, and the position sensor 160. Additionally, as indicated above, the system 200 may also include a controller 202 communicatively coupled to the imaging device 150, the position sensor 170, and (optionally) the light source 160. In general, the controller 202 is configured to analyze the images captured by the imaging device 150 to evaluate or assess the surface conditions within the field, such as by evaluating or assessing the size of soil clods behind an agricultural implement 12 during the performance of an agricultural operation. Additionally, the controller 202 may also be configured to execute one or more control actions in response to the assessment or evaluation of the field surface conditions. For instance, in one embodiment, the controller 202 may notify the operator of one or more parameters associated with the surface conditions being monitored, such as the size of the soil clods results from the current agricultural operation. In addition to notifying the operator (or as an alternative thereto), the controller 202 may be configured to execute one or more automated control actions adapted to adjust the monitored surface conditions, such as by increasing the downforce or downpressure on the tines 54 and/or the baskets 56 of the implement 12 when it is determined that the clod sizes are too large (e.g., the determined size or average size of the soil clods exceeds a given threshold or falls outside a desired range) in an attempt to reduce the clod sizing.

In general, the controller 202 may correspond to any suitable processor-based device(s), such as a computing device or any combination of computing devices. Thus, as shown in FIG. 6, the controller 202 may generally include one or more processor(s) 204 and associated memory devices 206 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 206 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 206 may generally be configured to store information accessible to the processor(s) 204, including data 208 that can be retrieved, manipulated, created and/or stored by the processor(s) 204 and instructions 210 that can be executed by the processor(s) 204.

In several embodiments, the data 208 may be stored in one or more databases. For example, the memory 206 may include an image database 212 for storing image data received from the imaging device 150, For example, the imaging device 150 may be configured to continuously or periodically capture images of the portion of the field extending across the shielded surface area 140 (FIGS. 3 and 4) defined underneath the sensor housing 106 as an agricultural operation is being performed with the field. In such an embodiment, the images transmitted to the controller 202 from the imaging device 150 may be stored within the image database 212 for subsequent processing and/or analysis. It should be appreciated that, as used herein, the term image data may include any suitable type of data received from the imaging device 150 that allows for the surface conditions of a field to be analyzed, including photographs and other image-related data (e.g., scan data and/or the like).

Additionally, as shown in FIG. 6, the memory 206 may include a surface condition parameter database 214 for storing information related to one or more parameters of the field surface condition(s) being monitored. For instance, when the controller 202 is configured to monitor the size of soil clods within the field based on the images captured by the imaging device 150, the determined size of each analyzed soil clod, including the determined volume of each clod, may be stored within the surface condition parameter database 214. In such an embodiment, the stored clod size data may be used to assess the effectiveness of the current agricultural operation being performed within the field and/or to make decisions regarding adjustments to be made to one or more operating parameters of the implement 12. For instance, the stored clod size data may be used to determine a mean or average clod size resulting from the performance of the agricultural operation. This mean or average clod size may then be compared to a predetermined or desired clod size range to assess the performance of the implement. In the event that the mean or average clod size does not fall within the target range, a suitable notification may be transmitted to the operator and/or a suitable corrective action may be performed in attempt to adjust the mean or average clod size resulting from the performance of the agricultural operation.

Referring still to FIG. 6, in several embodiments, the instructions 210 stored within the memory 206 of the controller 202 may be executed by the processor(s) 204 to implement a data capture module 216. In general, the data capture module 216 may be configured to control the operation of one or more of the components of the sensor assembly 100 to allow images to be captured by the imaging device 150 and subsequently transmitted to the controller 202. For instance, in one embodiment, the light source 160 may be configured to be continuously activated (i.e., continuously turned on such that light source 160 is constantly illuminating the interior of the sensor housing 106 and adjacent portion of the field surface 108. In such an embodiment, the controller 202 may, for example, be configured to control the operation of the imaging device 202 to allow images of the field surface 108 to be captured periodically or continuously. Alternatively, the light source 160 may only be configured to be activated (i.e., turned on) immediately before or simultaneously with an image captured by the imaging device 150. In such an embodiment, the controller 202 may be configured to control the operation of the light source 160 such that activation of the light source 160 coincides with or is based upon the timing and frequency at which images are being captured by the imaging device 150. For instance, in a particular embodiment, the controller 202 may be configured to activate the light source 160 in advance of an image capture by a predetermined time period (e.g., 100-500 milliseconds before each image capture) to ensure that the surface 108 of the field is properly illuminated for capturing images of any surface features located within the shielded surface area 140, as \veil as any adjacent shadows generated by such surface features.

Additionally, the instructions 210 stored within the memory 206 of the controller 202 may be executed by the processor(s) 204 to implement an image analysis module 218. In general, the image analysis module 218 may be configured to analyze the images received from the imaging device 150 using one or more image processing algorithms and/or computer vision techniques to assess one or more surface conditions depicted within the images, such as the size of soil clods depicted within the images. Such image processing algorithms and/or computer vision techniques may include, for example, an edge-finding routine in which the edges of each surface feature and each adjacent shadow depicted within an image are identified. By identifying the perimeter or outline of each surface feature and each associated shadow depicted within a given image via the edge-finding algorithm, one or more dimensional parameters of each surface feature and each associated shadow can be determined based on the number of pixels contained within the identified perimeter and/or extending across the identified perimeter in a given direction. For instance, the area of a soil clod may be determined by counting the total number of pixels contained within the perimeter of the soil clod (as identified via the edge-finding algorithm), while the length and width of the soil clod may be determined by counting the number of pixels extending across the perimeter of the soil clod in the lengthwise and widthwise directions, respectively. A similar analysis may be performed to determine, for example, the area, length, and width of the adjacent shadow formed by the soil clod.

Moreover, when assessing one or more of the dimensional parameters of the shadows depicted within each image, the image analysis module 218 may be configured to correct or adjust the determined dimensional parameter(s) based on the effective lighting angle 164 of the light source 160. For instance, as indicated above, the controller 202 may be communicatively coupled to the position sensor 170 of the sensor assembly 100 to allow height or position data indicative of the position of the light source 160 relative to the field surface 108 to be received by the controller 202. In such an embodiment, the image analysis module 218 may, for example, include a look-up table correlating the relative position between the light source 160 and the field surface 108 to the effective lighting angle 164 of the light source 160. The determined lighting angle may then be used to correct or adjust the determined dimensional parameter(s) for each shadow, as necessary.

For instance, based on the configuration of the sensor assembly 100, the apparent or visible dimensional parameter(s) of the shadows within each image may be relatively accurate when the effective lighting angle 164 is within a desired or optimal angular range. However, if the image analysis module 218 determines that the effective lighting angle 164 for the light source 160 is currently outside the desired angular range, the image analysis module 218 may be configured to adjust the determined dimensional parameter(s) of each shadow to account for the light source 160 being further away from or closer to the field surface 108 than expected or desired. For instance, if the effective lighting angle 164 for the light source 160 exceeds the maximum value of the desired angular range (thereby indicating that the light source 160 is further away from the field surface 108 than expected or desired), the image analysis module 218 may be configured to increase the determined dimensional parameter(s) of each shadow by a correction factor or value determined as a function of the lighting angle 164 given that the size of the shadow (as depicted) will be smaller due to the increased lighting angle 164. Similarly, if the effective lighting angle 164 for the light source 160 drops below the minimum value of the desired angular range (thereby indicating that the light source 160 is closer to the field surface 108 than expected or desired), the image analysis module 218 may be configured to decrease the determined dimensional parameter(s) of each shadow by a correction factor or value determined as a function of the lighting angle 164 given that the size of the shadow (as depicted) will be larger due to the reduced lighting angle 164.

Referring still to FIG. 6, the instructions 210 stored within the memory 206 of the controller 202 may also be executed by the processor(s) 204 to implement a control module 220. In general, the control module 220 may be configured to initiate a control action when it is determined that the monitored surface condition(s) does not fall within a desired range or does not meet or satisfy an associated threshold. As indicated above, in one embodiment, the control module 220 may be configured to provide a notification to the operator of the vehicle/implement 10/12 indicating that the monitored surface condition is not at a desired level, such as when the determined clod size exceeds a desired clod/size range. For instance, in one embodiment, the control module 220 may cause a visual or audible notification or indicator to be presented to the operator via an associated user interface 222 provided within the cab 22 of the vehicle 10.

In other embodiments, the control module 220 may be configured to execute an automated control action designed to adjust the operation of the implement 12. For instance, in one embodiment, the controller 220 may be configured to increase or decrease the operational or ground speed of the implement 12 in an attempt to adjust the monitored surface condition(s). In addition to the adjusting the ground speed of the implement 12 (or as an alternative thereto), the controller 202 may also be configured to adjust an operating parameter associated with the ground-engaging tools of the implement 12. For instance, as shown in FIG. 6, the controller 202 may be communicatively coupled to one or more control valves 224 configured to regulate the supply of fluid (e.g., hydraulic fluid or air) to one or more corresponding actuators 60, 62 of the implement 12. In such an embodiment, by regulating the supply of fluid to the implement actuator(s) 60, 62, the controller 202 may automatically adjust the down force or down pressure applied to the tines 54 and/or baskets 56 of the implement 12 in a manner, for example, adapted to adjust the size of the resulting soil clods.

Moreover, as shown in FIG. 6, the controller 202 may also include a communications interface 226 to provide a means for the controller 202 to communicate with any of the various other system components described herein. For instance, one or more respective communicative links or interfaces 228, 230, 232 (e.g., one or more data buses) may be provided between the communications interface 226 and the imaging device 150, position sensor 160, and light source 170 to allow data and/or control commands to be transmitted between the controller 202 and such components. Similarly, one or more communicative links or interfaces 234 (e.g., one or more data buses) may be provided between the communications interface 226 and the user interface 222, the control valves 224, and/or the like to allow the controller 202 to control the operation of and/or otherwise communicate with such system components.

Figure 7:
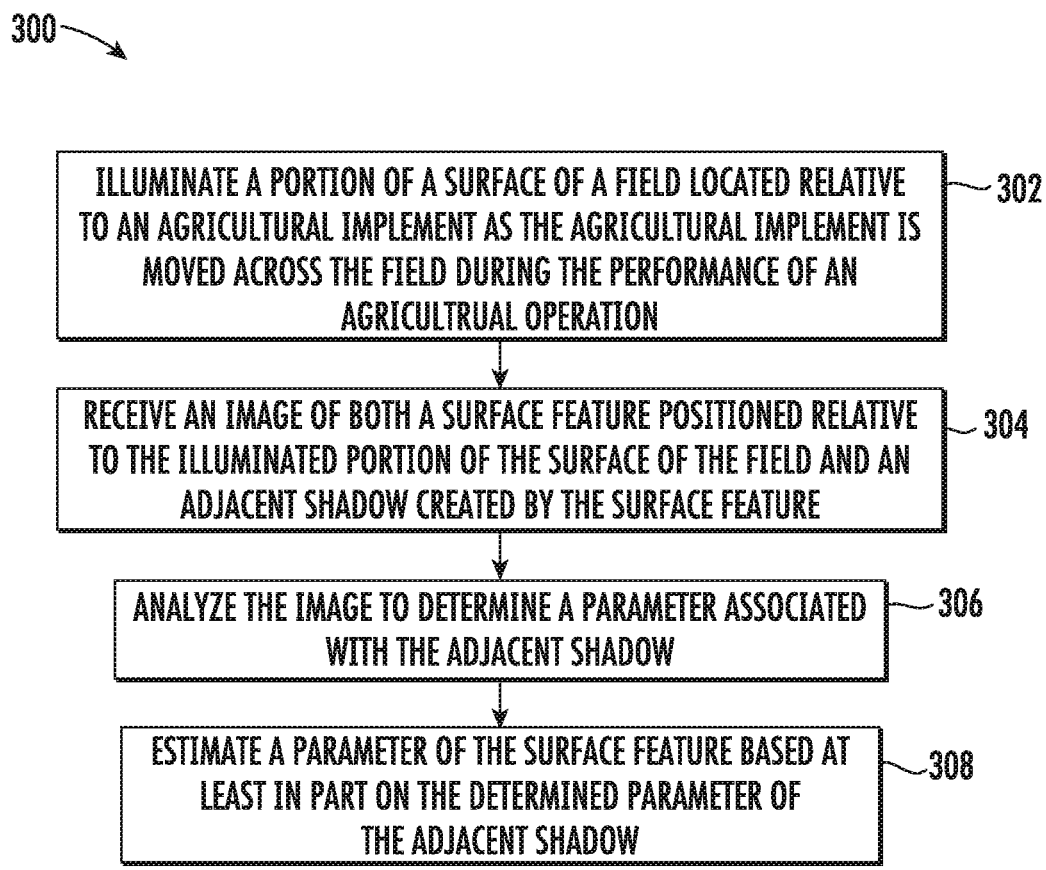
FIG. 7 illustrates a flow diagram of one embodiment of a method for monitor surface conditions of a field in accordance with aspects of the present subject matter.

Referring now to FIG. 7, a flow diagram of one embodiment of a method 300 for monitoring surface conditions of a field is illustrated in accordance with aspects of the present subject matter. In general, the method 300 will be described herein with reference to the agricultural implement 12, the sensor assembly 100, and the system 200 described above with reference to FIGS. 1-6. However, it should be appreciated by those of ordinary skill in the art that the disclosed method 300 may generally be implemented with any agricultural implement having any suitable implement configuration, any sensor assembly having any suitable configuration, and/or any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, anchor adapted in various ways without deviating from the scope of the present disclosure.

As shown in FIG. 7, at (302), the method 300 may include illuminating a portion of a surface of a field located relative to an agricultural implement as the agricultural implement is moved across the field during the performance of an agricultural operation. For instance, as indicated above, the disclosed sensor assembly 100 may include light source 104 configured to illuminate a portion of the field surface 108, such as the portion of the field surface 108 extending across the shielded surface area 140 defined directly underneath the sensor housing 106 of the sensor assembly 100.

Additionally, at (304), the method 300 may include receiving an image of both a surface feature positioned relative to the illuminated portion of the surface of the field and an adjacent shadow created by the surface feature, Specifically, as indicated above, an imaging device 150 of the sensor assembly 100 may be used to capture images of the illuminated portion of the field surface 108 located beneath the sensor housing 108. The images captured by the imaging device 150 may then be transmitted to and received by the controller 202 for subsequent processing and/or analysis.

Moreover, at (306), the method 300 may include analyzing the image to determine a parameter associated with the adjacent shadow. For instance, as indicated above, the controller 202 may be configured to analyze the images received from the imaging device 150 using one or more imaging processing algorithms and/or computer-vision techniques to determine one or more dimensional parameters of each shadow cast by a surface feature depicted within a Oven image.

Referring still to FIG. 6, at (308), the method 300 may include estimating a parameter of the surface feature based at least in part on the determined parameter of the adjacent shadow. For instance, as indicated above, the controller 106 may be configured to estimate or infer a dimensional parameter of surface feature that is not viewable or detected within the image based at least in part on the determined dimensional parameter of the adjacent shadow, such as the height 188 of the soil clods 180 described above. This estimated dimensional parameter may then be used assess the overall size of the image soil clod, such as by using the estimated dimensional parameter with one or more detectable dimensional parameters associated with the soil clod to determine the overall size of the clod.

It is to be understood that the steps of the method 300 are performed by the controller 202 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 202 described herein, such as the method 300, is implemented in software code or instructions which are tangibly stored on a tangible computer readable medium. The controller 202 loads the software code or instructions via a direct interface with the computer readable medium or via a wired and/or wireless network. Upon loading and executing such software code or instructions by the controller 202, the controller 202 may perform any of the functionality of the controller 202 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for monitoring field surface conditions during the performance of an agricultural operation, the system comprising:
    a support arm configured to be coupled to a frame of an agricultural implement;
    a housing coupled to the support arm such that the housing is supported adjacent to a surface of a field, the housing extending over a portion of the surface such that a shielded surface area is defined underneath the housing across said portion of the surface;
    a light source supported relative to the housing, the light source configured to illuminate at least a portion of the shielded surface area defined underneath the housing such that a shadow is created adjacent a surface feature positioned within the shielded surface area due to light from the light source being blocked by the surface feature, wherein the light source is configured to direct light across the at least a portion of the shielded surface area at a lighting angle;
    an imaging device positioned within the housing such that the imaging device has a field of view directed towards the at least a portion of the shielded surface area, the imaging device configured to capture an image of the surface feature and the adjacent shadow created by the surface feature;
    a controller communicatively coupled to the imaging device, the controller configured to:
        analyze the image to determine a dimensional parameter of the adjacent shadow; and
        estimate a parameter associated with the surface feature based on the dimensional parameter of the adjacent shadow depicted within the image and on the lighting angle; and
    a position sensor communicatively coupled to the controller, the position sensor configured to provide data to the controller indicative of a position of the light source relative to the surface of the field,
    wherein the controller is configured to determine the lighting angle at which the light from the light source is directed across the at least a portion of the shielded surface area based on the data received from the position sensor.

2. The system of claim 1, wherein the light source is positioned within the housing such that the lighting angle, as defined relative to a horizontal reference plane, is equal to or less than 25 degrees when the housing is positioned adjacent to the surface of the field.

3. The system of claim 1, wherein the parameter associated with the surface feature comprises a dimensional parameter of the surface feature, the controller being configured to estimate the dimensional parameter of the surface feature based at least in part on the determined dimensional parameter of the adjacent shadow.

4. The system of claim 3, wherein the dimensional parameter of the surface feature comprises a first dimensional parameter of the surface feature that is not viewable within the field of view of the imaging device.

5. The system of claim 3, wherein the controller is further configured to analyze the image to determine a second dimensional parameter of the surface feature that is viewable within the field of view of the imaging device, the controller being configured to estimate a size of the surface feature as a function of the first dimensional parameter and the second dimensional parameter.

6. The system of claim 1, wherein the surface feature comprises a soil clod positioned on the surface of the field.

7. The system of claim 1, wherein the controller is communicatively coupled to the light source, the controller being configured to control an operation of the light source such that the light source is activated to illuminate the at least a portion of the shielded surface area immediately before or simultaneously with the image being captured by the imaging device.

8. The system of claim 1, wherein the controller is further configured to provide a notification to an operator of the agricultural implement indicative of the estimated parameter associated with the surface feature or execute a control action to adjust an operating parameter of the agricultural implement based on the estimated parameter associated with the surface feature.

* * * * *